United States Patent [19]

Stoeberl

[11] 3,956,549

[45] May 11, 1976

[54] BOAT HULL CONNECTOR AND METHOD

[76] Inventor: Helmut Stoeberl, 8201 Eggstaett-Bachham, Germany

[22] Filed: Oct. 29, 1974

[21] Appl. No.: 518,752

Related U.S. Application Data

[62] Division of Ser. No. 322,098, Jan. 9, 1973.

[52] U.S. Cl. .................................... 428/71; 156/79; 156/245; 156/267; 264/46.6; 428/81; 428/192; 428/315
[51] Int. Cl.² ......................................... B32B 3/26
[58] Field of Search ........... 264/46.6; 161/161, 160; 428/71, 81, 192, 315; 156/79, 245, 267

[56] References Cited
UNITED STATES PATENTS

| | | | |
|---|---|---|---|
| 2,753,642 | 7/1956 | Sullivan | 264/46.6 |
| 3,091,946 | 6/1963 | Kesling | 264/46.6 |
| 3,346,221 | 10/1967 | Farmer | 264/46.6 |
| 3,383,440 | 5/1968 | Chaldekas | 264/46.6 |
| 3,437,549 | 4/1969 | Winer | 161/160 |
| 3,773,875 | 11/1973 | Lammers | 264/46.6 |

Primary Examiner—William J. Van Balen
Attorney, Agent, or Firm—Hill, Gross, Simpson, Van Santen, Steadman, Chiara & Simpson

[57] ABSTRACT

The opposed moulded plastic shells of a shell covered foam filled structural member suitable for boat hulls and decks are connected together by a strip of material extending between the shells and anchored in the foam filling. Flaps are provided on the connector strip overlying the periphery of the plastic shells in sealing relation therewith. The flaps can be provided on a separate strip with a tongue seated in a recess of the strip anchored in the foam. The connector strip has an outer edge portion secured in the parting line of moulds carrying the shells and providing a cavity for the foam which is severed from the connector strip after removal from the moulds.

13 Claims, 43 Drawing Figures

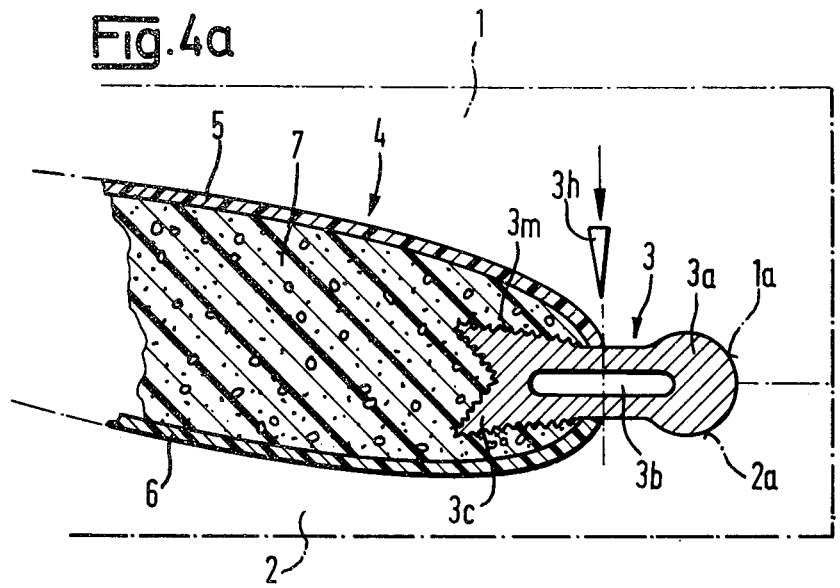
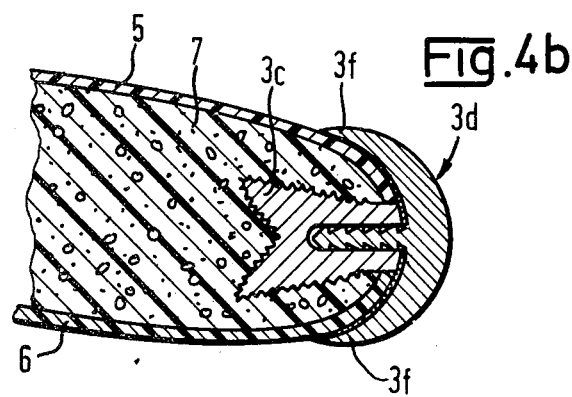
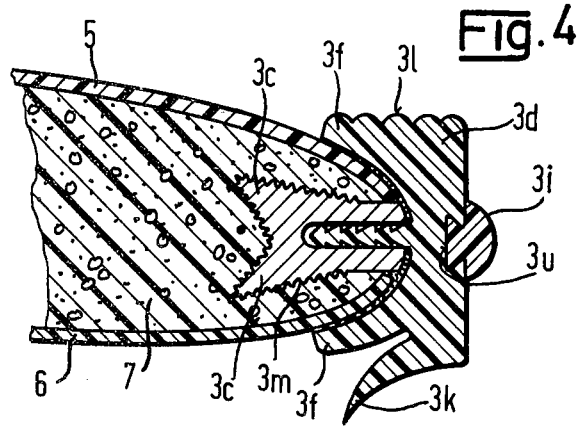

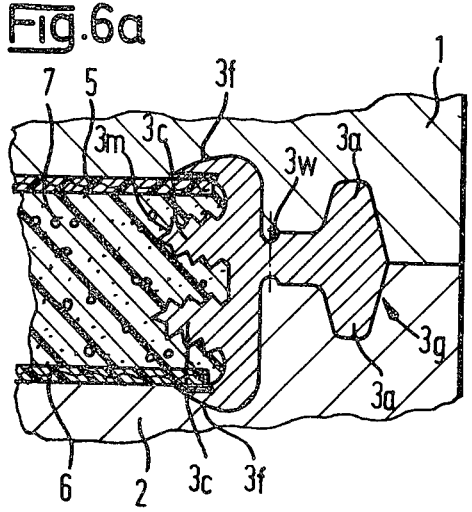
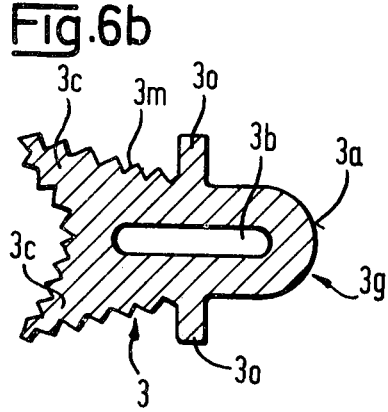
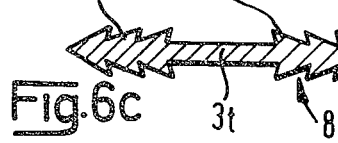
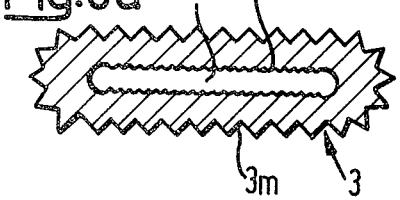
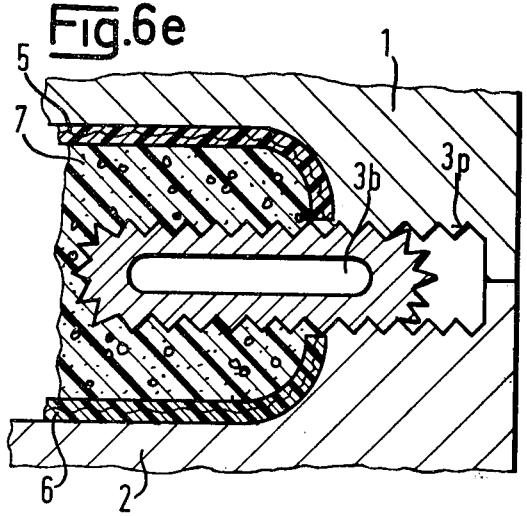
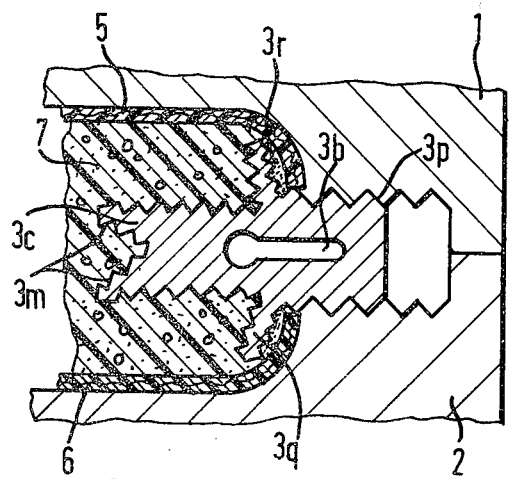
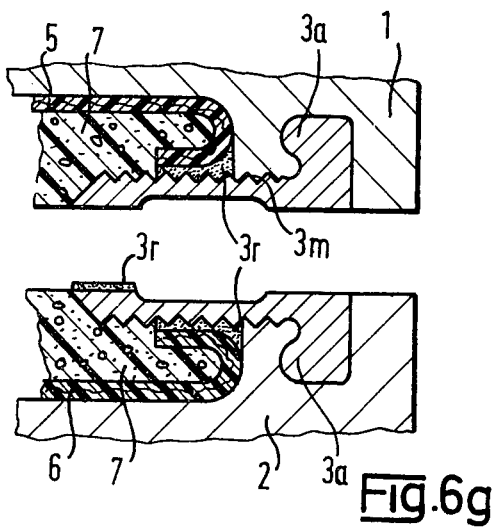

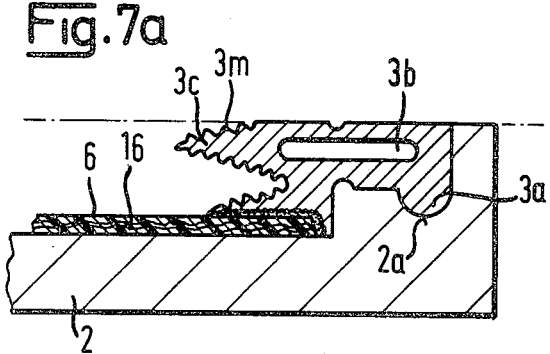
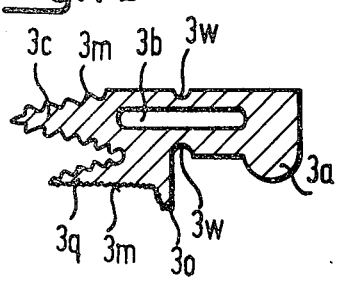
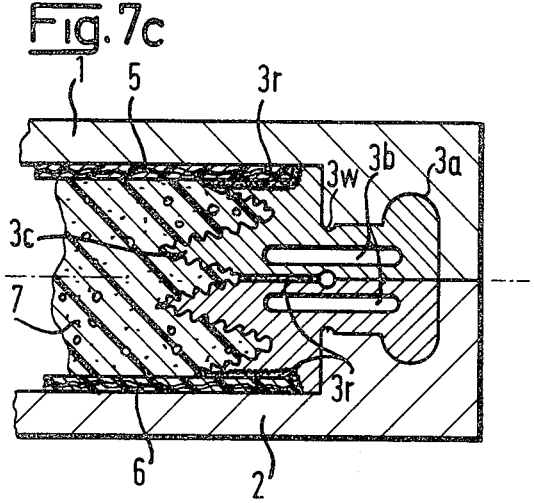
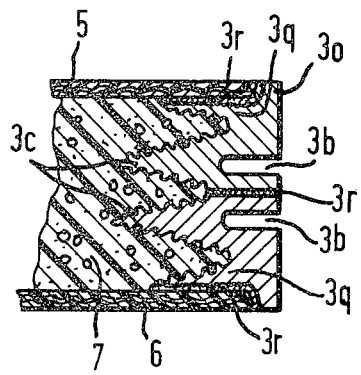
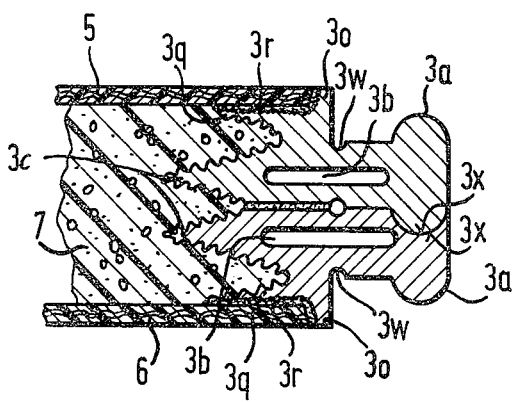
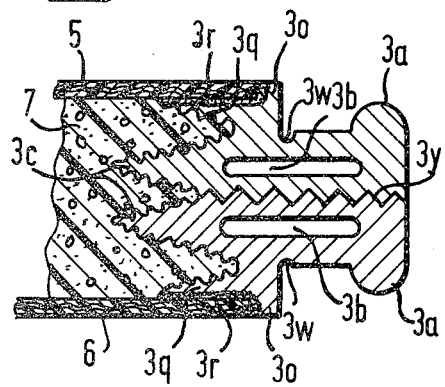

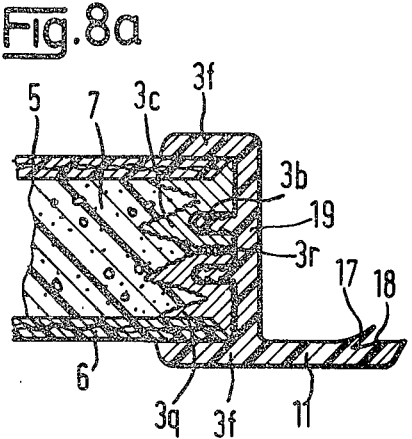
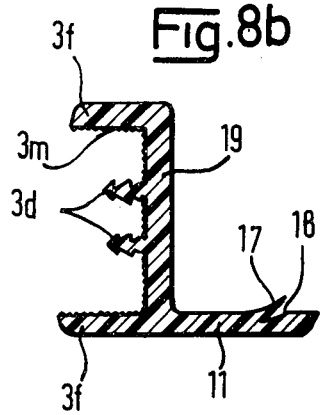
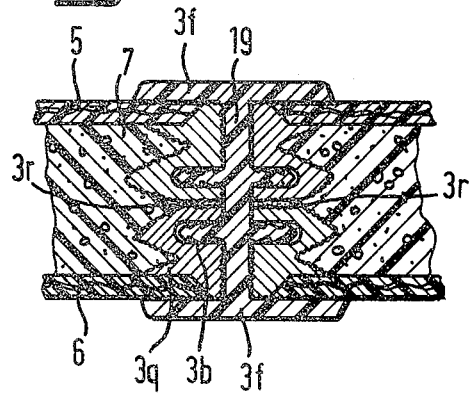
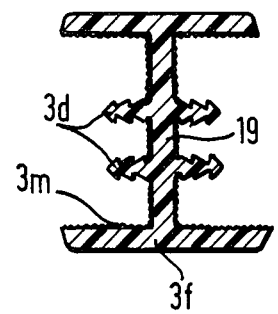
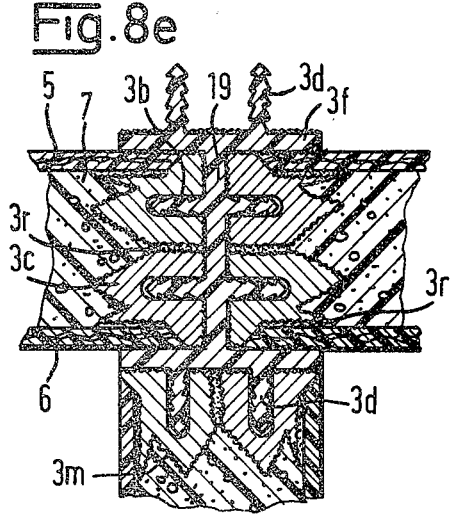
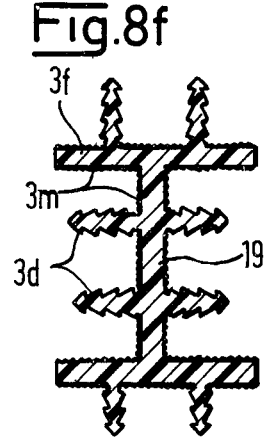

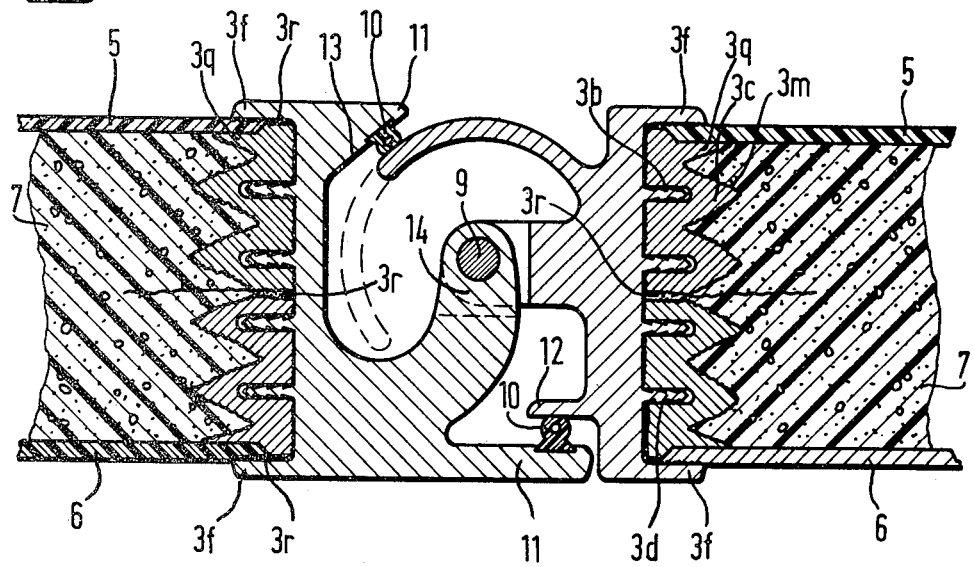
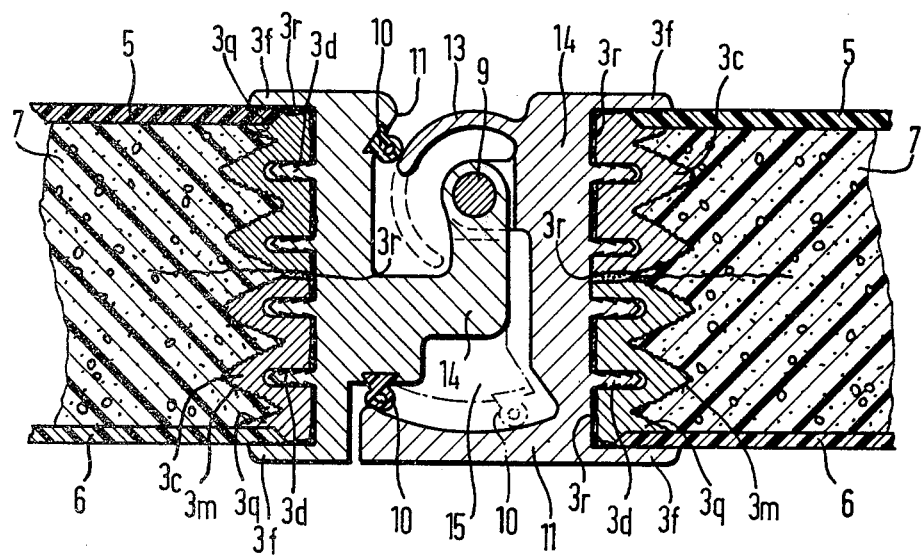

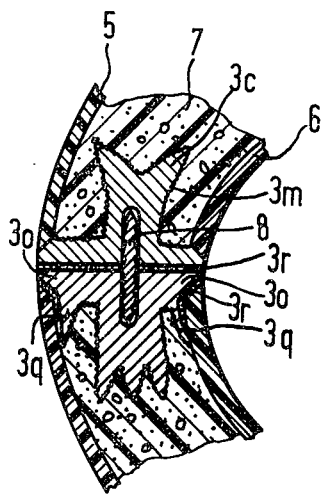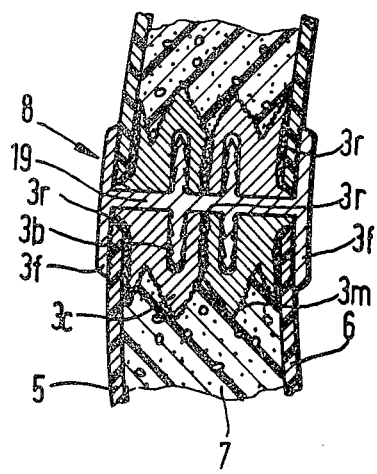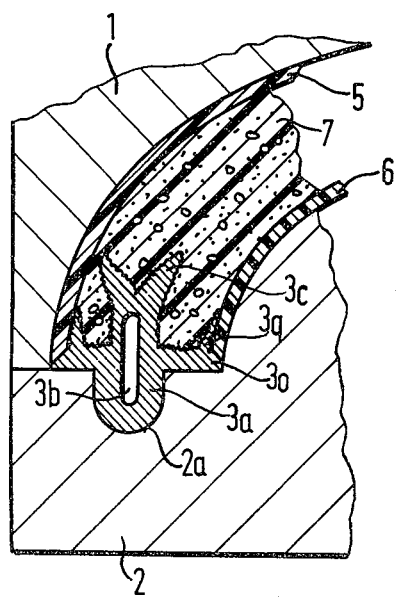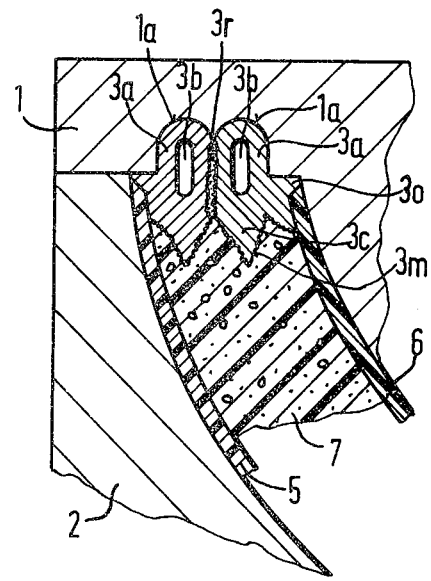

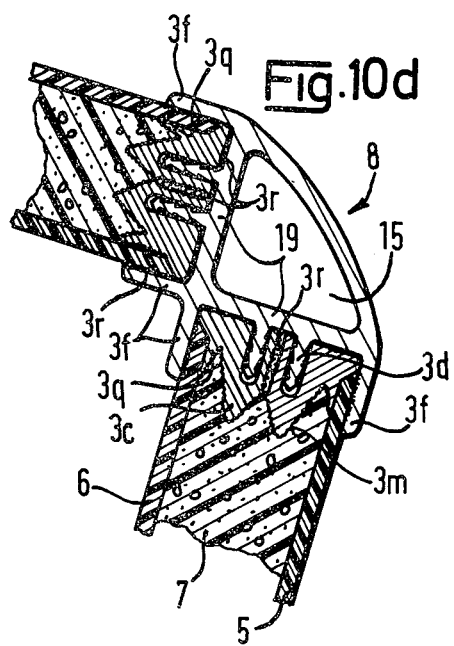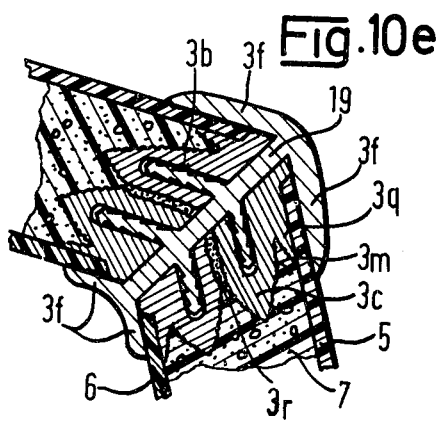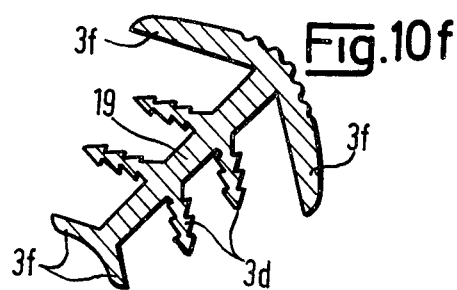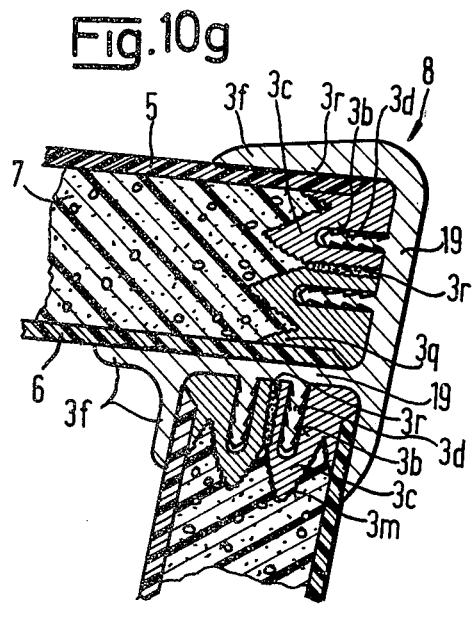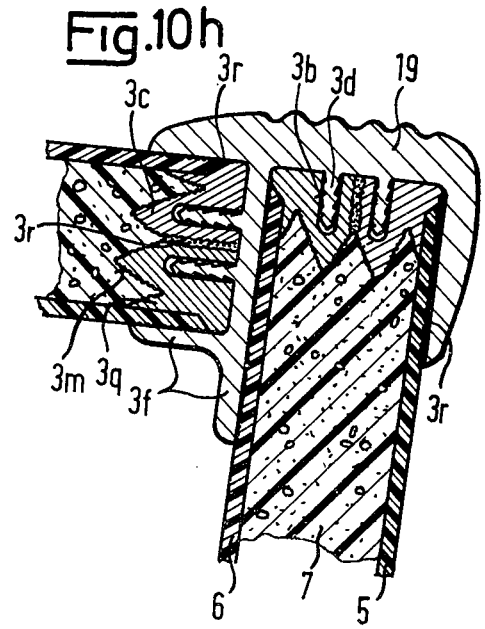

BOAT HULL CONNECTOR AND METHOD

This is a division of application Ser. No. 322,098 filed Jan. 9, 1973.

The invention relates to a shell connector and a method and apparatus for making foamed shell members using the shell connector, in which a plastics layer, more particularly reinforced by an insert, is introduced into mould halves, and liquid, age-hardening foamed material is injected into the mould cavity after the mould has been closed.

As a rule during the making of shell members one or more layers of an age-hardening plastics are as a rule introduced into the opened mould surfaces of the mould halves used for making mould parts; the strength and retention of shape of the plastics can be substantially increased more particularly by single or multiple layer impregnation and the insertion of reinforcing inserts, such as fabrics, fleeces, fibres multi-layer mats or the like. Liquid, foaming and age-hardening plastics is injected, more particularly at elevated pressure, into the mould cavity after the mould halves have been closed.

On completion of the curing period the mould halves are opened and the finished foamed shell member removed from the mould halves.

When a shell member is made in open mould halves, the mould being constructed in two or more parts, the outer plastics layer can be brought only as far as the edge of the mould separating plane. Since for foaming the mould halves must be tightly closed, the formation of the free edges of the plastics shells in the zone of the mould separating plane is highly critical, since if too much of the outer plastics or reinforcing laminate layers is applied they will overflow or project into the zone of the mould separating plane and the mould halves will no longer be able to close tightly, so that the foamed material filled with excess pressure will emerge along the mould separating plane and it will be impossible for the pressure necessary for the adjustment of the pore size to be developed inside the mould.

More particularly when laminates, such as glass fibre fabrics, multi-layer reinforcing laminates or the like are inserted, their cutting edges often project beyond the mould separating plane and the removal of the projecting parts, for instance, in a glass fibre reinforced plastics layer, is extremely difficult, more particularly after the curing of the plastics insert, the result often being damage to the mould halves which are also made, for instance, of plastics.

When the outer plastics layer and the inserts are carefully introduced into the mould they usually stand back, more particularly irregularly behind the mould separating plane, so that after foaming there is an irregular foamed material edge in the zone of the mould separating plane, and the adjacent plastics outer layers are not connected. Through this foam material edge moisture or harmful gases can get into the foam material core and reduce the strength of the shell member. More particularly, however, due to inside pressure during foaming liquid foamed material gets out into the zone of the mould separating plane, which can never be completely closed, so that there is frequent overflowing and the projecting foamed material residues must be laboriously removed, with the result that rough edges are also produced.

This is where the invention comes in; it relates to the problem of so forming the shell members to be made in the zone of the surrounding mould separating planes that the full strength of the shell member is maintained even in the zone of the mould separating planes, the result being a sealing-tight closure without the need for subsequent precise machining of the outer plastics layer in the moulding of the shell members, a step which of course results in high costs. More particularly the edge zone of the shell member must allow the reception of reinforcing, protective and connecting means which can be applied after the foaming and curing of the member without harming the plastics or foamed material layer.

It is also an object of the invention to provide a method of making shell members in multiple moulds, as a result of which smoothly closed sealing-tight very strong member edges can be produced even in the zone of the mould separating planes without the need for difficult fitting work during lamination or subsequent machining after the members have been removed from the mould.

It is also an object of the invention to afford the possibility of connecting shell members along their edges needed for constructional reasons, in order to produce a very strong sealing-tight connection.

It is also an object of the invention to afford a possibility of applying extra reinforcements in the zone of the outer edges of shell members without the need for the difficult introduction of laminates or the like.

Another object of the invention is to provide an apparatus enabling shell members to be produced which are accurate, smooth, flat, sealing-tight and very strong even in their edge zones.

The invention relates to a shell connector for forming solid sealing-tight abutting edges, at least in the zone of the separating planes of foamed shell members made in multiple moulds.

To this end according to the invention, a shell connector has at least one anchoring element constituted by a lug and/or corrugations, grooves or the like which extend by a substantial portion of the shell connector into the foamed material core and is adjoined by a shell connector zone extending beyond the abutting edges of the shells and having at least centring profile co-operating with matching centring and receives grooves in at least one mould half.

This construction of the edge of a foamed shell member enables an extremely strong sealing-tight connection to be obtained between the merging outer skins of the shell members in the zone of the separating plane and also allows the satisfactory insertion of the connector profile; moreover, to produce smooth, accurately aligned outer edges of the shell member, the two mould halves used in manufacture can be centred immovably along the whole of the mould separating planes, so that all that need then be done to the resulting shell member is simply to remove the centring profile.

According to a further development of the invention, the zone of the abutting edges of the shells, the shell connector is formed with at least one snap-in recess extending beyond the abutting edge zone, starting thereabove. This construction enables the zone of the transition of the two abutting shell outer skins to the shell connector to be covered by a snap-in profile which can exert a covering effect, and also a reinforcing and sealing one; a completely tight closure can be achieved by forming a snap-in profile even into the foamed material core.

Advantageously the snap-in recess has a slot-shaped cross-sectional profiling, so that the shell connector can be made with a core, for instance, by simple extrusion process. The slot-like cross-section enables a matchingly shaped snap-in profile to be snapped into the slot; due to the resilient properties of the shell connector and the snap-in profile and of the result of matching teething, but more particularly with an application of adhesive, the profile adheres securing and sealing-tight.

According to a further feature of the invention the snap-in recess has a known corrugation, grooving, toothing, surface activation, adhesive application, sealing layer, or the like; as a result the introduction of the covering, edge or connecting profile is facilitated and at the same time close connection is achieved therewith, enabling a very strong edge to be formed on the shell member to be produced.

According to another feature of the invention shell connector has on one or both sides in the zone of the abutting edges of the shells a drawn-in portion marking the subsequent parting cut. The marking enables a cutting tool, parting disc or the like to be guided along the drawn-in portion of the shell member edge, so that a smooth sealing-tight closure can be obtained; the drawn-in portion can act as a guide.

According to another feature of the invention, the centring profile of the shell connector is undercut to correspond with the receiving grooves in the mould halves. As a result of this step the shell connector can be prevented from dropping out even with a suspended arrangement, for instance, when the top mould half is placed on the bottom mould half, so that the shell connector is securely retained and the customary placing-on movements do not result in a change of the position of the shell connector parts. When the two mould halves are taken apart, the removal of the shell connector parts from the receiving grooves can readily be performed due to the resilient deformation of the slight undercutting.

According to another feature of the invention, the shell connector comprises two co-operating parts each corresponding with one mould half. As a result of this construction of the shell connector each time a shell connector component profile is inserted in one of the mould halves, so that the adjoining shell member outer skin can be formed immediately on the shell connector part; as a result a shell connector component profile can be inserted in each of the mould halves. Before the shell members are assembled, the contact surfaces of the shell connector component profiles to bear against one another subsequently can be given a plastics application, the result being to form a coherent shell connector edge profile.

To centre the two shell connector component profiles and therefore the mould halves also satisfactorily, even when the shell connector profiles are in several parts, according to another feature of the invention the two matching shell connector parts have in their mutual zone of contact a matching centring toothing and-/or snap-in recess. The result is that when the two mould halves are laid on one another, the shell member outer edge to be produced run straight without further centring means, since the two edges can be precisely adjusted due to the corresponding centring toothing.

According to another feature of this invention, the shell connector outer surface has a multiple toothing co-operating with a matching toothing of the receiving grooves in the mould halves. This step enables the shell connector, for instance, with multiple toothing to be inserted in the mould half in different positions in relation to the shell member edge to be produced, so that the shell connector extends to the varying depth into the shell member, and the receiving grooves in the mould halves; with only shell connector construction, therefore, the shell connector edge construction can be wider or narrower. As already stated, the projecting part is cut off, so that when the snap-in recess completely merges from the edge zone, such recess can also be parted and a smooth joint obtained.

Also according to the invention the in zone of the shells the shell connector has covering flaps, attaching flaps, outer edges or the like bearing against the shells on the inside and/or outside. As a result, a mere application of plastics in the zone of such attaching or covering flaps produces a satisfactory sealing tight very strong connection between the corresponding shell connector zones and the adjacent shell outer skin zones, and an outer edge can be produced which consists of the shell connector material, so that the whole edge is formed from shell connector material.

For better connection, adhesion, and sealing advantageously the sides of the covering flap, attaching flaps, outer edges or the like which bear against the shell surfaces and/or shell edges have a known corrugation, grooving, roughening, surface activation or the like; as a result, the parts to be connected adhere with maximum strength and sealing tightness.

Also according to the invention, starting from one or more central zones, the shell connector and/or corner profile has one or more reinforcing ribs projecting into the shell member cavity to be foamed. As a result, when moulding the shell connector with its reinforcing ribs, which are enclosed and retained on all sides by the foamed material to be pressed in, a reinforcement can be produced which can readily be introduced subsequently — i.e., after the making of the shells in the mould halves — and is retained secured in its required positions during foaming, a very strong connection being obtained by its being enclosed on all sides in the foaming body. Due to this more particularly the edges and also the intermediate zones can be reinforced; as already stated, in the intermediate zones as a result of the aforementioned corner connectors and corner profiles, such reinforcing ribs can also be disposed, with the result that the reinforcing ribs can be moulded into the shell member in any zone by the use of the shell member in any zone by the use of the shell connector or corner connector.

According to another feature of the invention the reinforcing ribs have a known roughening, corrugation, profiling, surface activation, rubberisation, plastics application, or the like, so that the attachment in the cavity to be foamed is extremely strong and an integrated high strength member can be produced. This means that not only the corner profiles, but also the shell connectors themselves have if necessary, in the various embodiments characterised, reinforcing ribs which extend into the mould cavity and become thermally attached during the foaming thereof.

According to another feature of the invention, there is disposed on the shell member or shell connector, in combination therewith, a snap-in profile which covers the free side of the shell connector and more particularly the abutting edges of the shell member outer skin, and engages by snap-in teeth in the snap-in recess or recesses. This feature achieves an important further development of the invention, namely that even the abutting edges between the shell member outer skin and the shell connector are covered by the snap-in profile, thus achieving the aforementioned covering and impact-protecting effect, and also a reinforcing effect. According to a further feature of the invention the snap-in profile has covering flaps covering the shell member outer surfaces adjoining the separating planes, so that the width of the selectable part of such covering flaps can overlap the abutting joint zone and therefore the snap-in profile even completely covers the individual shell member edges.

To secure the snap-in profile according to a further feature of the invention, the sides of the snap-in profile, snap-in teeth and/or covering flaps adjacent the shell member have a known corrugation, grooving, surface activation, plastics application, rubberisation, sealant application or the like; this is to produce a firm connection between the adjoining surfaces and complete sealing tightness.

According to another feature of the invention, the snap-in profile has one or more snap-in profilings, webs cover strips, stop strips, sliding surfaces, hinge profiles, cavities, sealing lips, snap-in recesses or the like. As a result the snap-in profile can be used as a connecting profile to adjacent members, a covering profile for adjoining members or a hinge for the attachment of doors with cavities for the reception of cables or the like or for the attachment of hollow rivets, without the creation for this purpose of a connection open to the outside; sealing lips can also be provided, for instance, to create a satisfactory transition to the other members when the corner profile or snap-in profile is constructed as a connecting profile. The matching hinge profiles can be recessed alternately and engaging over one another and connected via a hinge pin so that, for instance, the same corner profile can be used both as a hinge and also as a pure corner profile for use with a door.

As already stated, the individual corner profiles and corner connectors and also the shell connectors can have reinforcing ribs, wth moulding lugs, anchoring lugs, corrugations or the like to improve adhesion and also improve the rigidity and strengthen the members. More particularly the construction of the snap-in profile according to the invention in conjunction with the shell connector according to the invention enables the shell members of weakly reinforced in their essential surface to be given edge zones of high strength, thus affording extremely high strength and sealing tightness of the members more particularly for use in ship building, automotive engineering, multi-storey buildings and the like.

The invention also provides a method of making a foamed shell member, stating from the fact that the actual outer shell is introduced into the open mould half by coating or injection and also has reinforcements, fabric inserts, fibre inserts, or the like. Conventionally the mould halves are closed and their cavity foamed, accompanied by the foaming of the shell connector. Then, after opening and the removal of the finished member that part of the shell connector, which projects beyond the outline of the shell member and was used for retaining and centering in the mould half or halves, is parted. As a result the shell connector is always inserted into the mould halves in its exact required position, so that the exact required position is also maintained with relation to the shell outer parts and outer walls; moreover, the profiling recesses and centring profilings result in a satisfactory fittable part, more particularly a satisfactory centring of the two mould halves, so that even with large serial production and wear on the moulds, the abutting and end edges of the shell members to be produced can be precisely moulded even in the zone of the mould separating planes.

A further development of the method, using a shell connector having at least one snap-in recess, is that a snap-in profile, more particularly with the addition of plastics, adhesives, sealing agents, melting-in, vulcanisation or the like, is pressed into the snap-in recesses exposed by the parting cut, so that then the whole shell member edge is covered, reinforced and sealed, at least in the zone of the shell connector.

The invention also provides an apparatus for using the shell connector and performing the aforedescribed method, according to which one or more receiving grooves for a centring profile of a shell connector is or are disposed in at least one mould half in the zone of the or each mould separating plane of the or each mould part. Accordingly, along the mould separating planes — i.e., parallel therewith, there are provided receiving grooves in which a shell connector is inserted; the use of the shell connector enables the shell connector itself to be adjusted in a very simple manner in relation to the shell member edge to be produced, but it also at the same time enables the two moulds to be adjusted in relation to one another, so that the result is accurately parallel guiding and parallel position of the shell members edges to be produced, even if the shell moulds or mould halves should warp.

Also according to the invention the receiving grooves for the centring profile are conical, of round profile, toothed, undercut or the like. The result is a very accurate and easily cleaned profiling centring, and at the same time the use of a toothing enables various relative positions to be reached both of the shell connectors and the moulds and therefore the shell member to be produced, and also if necessary even between the two mould halves.

Further advantages and features can be gathered from the following description.

Embodiments of the invention will now be described in greater detail with reference to the drawings, wherein:

FIG. 2 is a diagrammatic sectional detail through the finished shell member with the shell connector and the snap-in part inserted, also showing the parted shell connector part and the snap-in part before snapping in.

FIGS. 4a – 4c show diagrammatically the variant embodiments of the shell connector and its use.

FIGS. 6a – 6g show various profile constructions of the shell connector and a connecting profile.

FIGS. 7a – 7f show embodiments and applications of a two-part shell connector.

FIGS. 8a – 8h show embodiments and applications of a shell connector for abutting sheet joints.

FIGS. 9a – 9c show embodiments and applications of a shell connector for relatively thick members.

FIGS. 10, 10a – 10h illustrate the use of a shell connector in the making of a boat's hull

In the following description the following references are used:

| | |
|---|---|
| 1 | top mould half |
| 1a | receiving groove |
| 2 | bottom mould half |
| 2a | receiving groove |
| 3 | shell connector |
| 3a | centring profiling |
| 3b | snap-in recess |
| 3c | anchoring lugs |
| 3d | snap-in profile |
| 3e | snap-in teeth |
| 3f | covering flaps |
| 3g | parted portion |
| 3h | parting cut |
| 3i | decorative profile |
| 3k | sealing lip |
| 3l | corrugated strip |
| 3m | corrugation |
| 3n | corner profile |
| 3o | outer edge |
| 3p | toothing |
| 3q | attaching flaps |
| 3r | adhesive plastics application |
| 3s | hooked teeth |
| 3t | middle member |
| 3u | snap-in recess |
| 3v | drip lug |
| 3w | drawn-in portion |
| 3x | intermediate profile |
| 3y | centring toothing |
| 3z | central zone |
| 4 | shell member |
| 5 | upper shell |
| 5a | shell parts |
| 6 | bottom shell |
| 6a | shell part |
| 7 | foamed material core |
| 8 | connector |
| 9 | hinge pin |
| 10 | sealing profile |
| 11 | covering strip |
| 12 | stop strip |
| 13 | sliding surface |
| 14 | hinge profile |
| 15 | cavity |
| 16 | reinforcing insert |
| 17 | sealing lip |
| 18 | sealing recess |
| 19 | web |
| 20 | setting-up surface |
| 21 | reinforced edge |
| 22 | reinforcing ribs |

Figure 1:
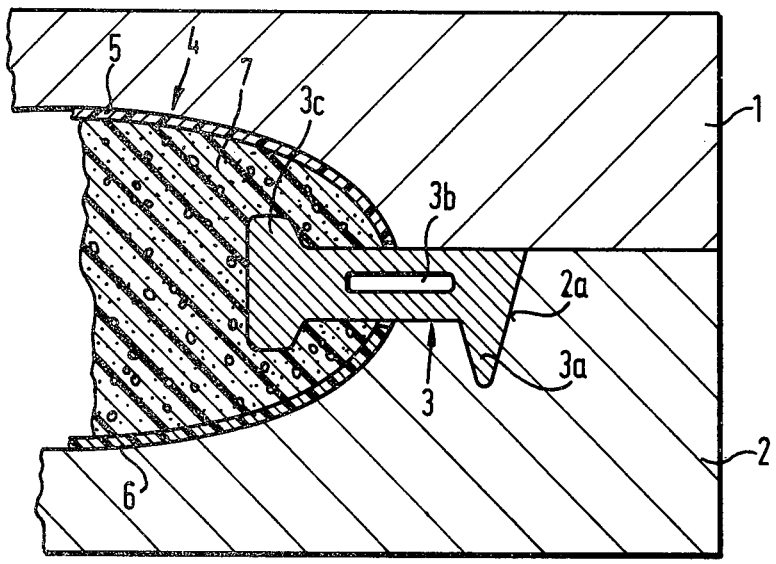
FIG. 1 is a diagrammatic section through a closed mould with inserted shell connector and foamed shell members.

FIG. 1 shows an embodiment of the use of the shell connector according to the invention, in which the shell member is made by means of two mould parts, namely a top mould half 1 and a bottom mould half 2, separating means being applied to the mould surfaces of the opened mould halves 1, 2, whereafter a first, more particularly coloured synthetic resin layer is applied, after whose curing one or more further plastics layers are applied, more particularly one or more reinforcing inserts, fibrous fleeces, reinforcing mats, multilayer laminating inserts or the like are introduced into the plastics body, so that an extremely resistant outer cover layer is formed which forms a top shell 5 and a bottom shell 6.

Referring to FIG. 1, the bottom mould half 2 is formed with a receiving groove 2a which extends substantially parallel with the edge of a shell member 4 and the bottom shell 6 and into which the shell connector 3 according to the invention is inserted and retained in the receiving groove 2a by a centring profiling 3a. The wedge shaped construction of the receiving groove 2a and the corresponding construction of the centring profiling 3a retains the shell connector 3 securely in the bottom mould half 2.

The shell connector according to the invention can be made of conventional material which combines well with the material of the shell members and the foamed material later filled in, for instance, the shell connector can be made of hard rubber, neoprene, PVC, metal, plastics or the like; more particularly the surface of the shell connector 3 can have a surface activation, roughening, profiling, corrugation or the like for the improvement of adhesion and moulding, and layers improving adhesion and bonding can be applied to the surface of the shell connector profile, which, for instance, can be made in the form of a continuously extruded profile, either during extrusion or subsequently. For instance, a plastics coating can be melted, dissolved or vulcanised on or the like even if an aluminum profile is used. As shown diagrammatically in FIG. 1, the shell connector 3 has an outer profiling 3a and an inner anchoring profiling with anchoring lugs 3c, which, for instance, can be shaped like hammer heads or can have an extra profiling increasing the surface.

In the zone of transition between the two shell members, namely the top shell 5 and the bottom shell 6, the shell connector 3 has a snap-in recess 3b, so that when the two shell members have been removed from the mould halves 1, 2, the snap-in recess 3b partly extends outside the outline of the shell members 5, 6 and partly inside such outlines. As already stated, after the introduction of top and bottom shells 5, 6 into the top and bottom mould halves 1, 2, the shell connector is inserted by its centring profiling 3a in the receiving groove 2a in one mould half, the bottom mould half as shown in FIG. 1, whereafter the top mould half 1 is laid on the bottom mould half 2. Liquid foamed material is then injected through suitable inlet apertures into the cavity between the top shell 5 and the bottom shell, to form a foamed material core 7 which becomes intimately connected to the free inner surfaces of the top and bottom shells 5, 6 and the free surface of the shell connector 3 to form a compact member. The end zones of the top shell 5 and bottom shell 6 adjoining the shell connector 3 are made flush with the mould surface before the assembly of the mould halves 1, 2, so that such assembly offers no difficulty, and after the assembly of the mould halves 1, 2 the free ends of the top and bottom shells 5, 6 tightly adjoin the corresponding surfaces of the shell connector 3.

After the foamed material filling has been cured, the resulting shell member 4 can be removed from the opened mould halves 1, 2 whereafter a parting cut 3h is performed in the zone where the top shell 5 merges into the bottom shell 6, so that the outer portion of the shell connector 3 which takes the form of a centring profile 3a is eliminated and the snap-in aperture 3b is exposed by the parting cut 3h performed.

Figure 2:
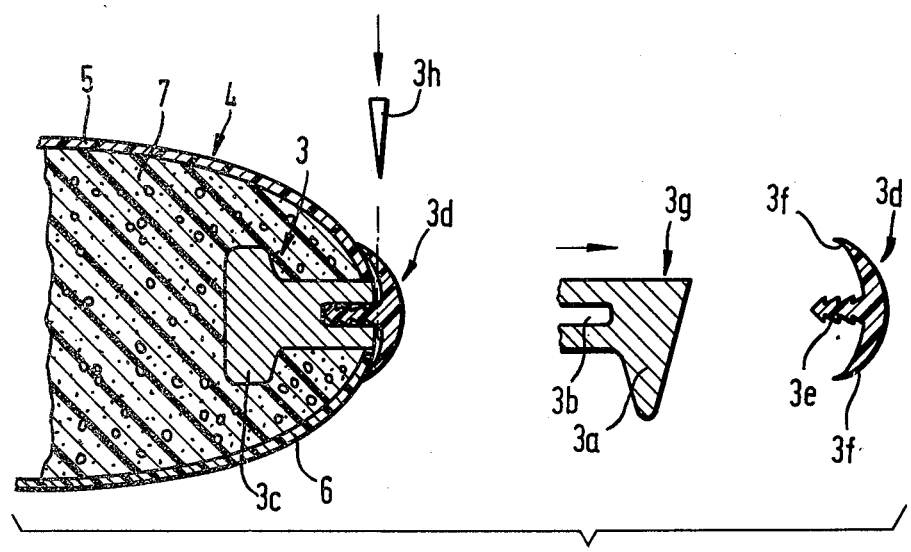

As can be gathered from FIG. 2, to this end the parting cut 3h extends along the edge of the shell member 4, so that the parted portion 3g of the shell connector 3 drops off the shell member, whereafter a snap-in profile 3d is driven, pressed, glued or the like into the snap-in recess 3b, as shown on the right hand side of FIG. 2. The snap-in profile 3d has, for instance, two covering flaps 3f shaped to correspond to the edge profiling of the shell member, the outer edges of the covering flaps 3f being bent down slightly to match the shape of the shell member in the direction thereof, so that after the snap-in profile 3d has been snapped into the snap-in recess 3b in the shell connector 3 a certain pre-stressing is produced by which the covering flaps 3f are pressed by their edges in sealing tight relationship on to the surface of the top and bottom shells 5, 6. The snap-in profile 3d is retained by a central web having snap-in teeth 3e which have a rearwardly directed toothing, so that when the snap-in teeth 3e have been pressed or driven in, the snap-in teeth 3e are retained with considerable prestressing in the snap-in recess 3b in the shell connector 3 to which end, as already stated, an extra application of adhesive plastics or paint can be applied, or else a sealing strip.

The aforementioned prestressing of the covering flap 3f, having a pressing effect, and more particularly the use of a plastics application in the snap-in recess 3b or on the inside of the covering flaps 3f and of the snap-in teeth 3e can produce a firm sealing tight connection, thus avoiding the usual rough appearance of plastics members made of two shells; at the same time a secure connection is made via the adhesive surface of the shell connector 3.

Figure 3A:
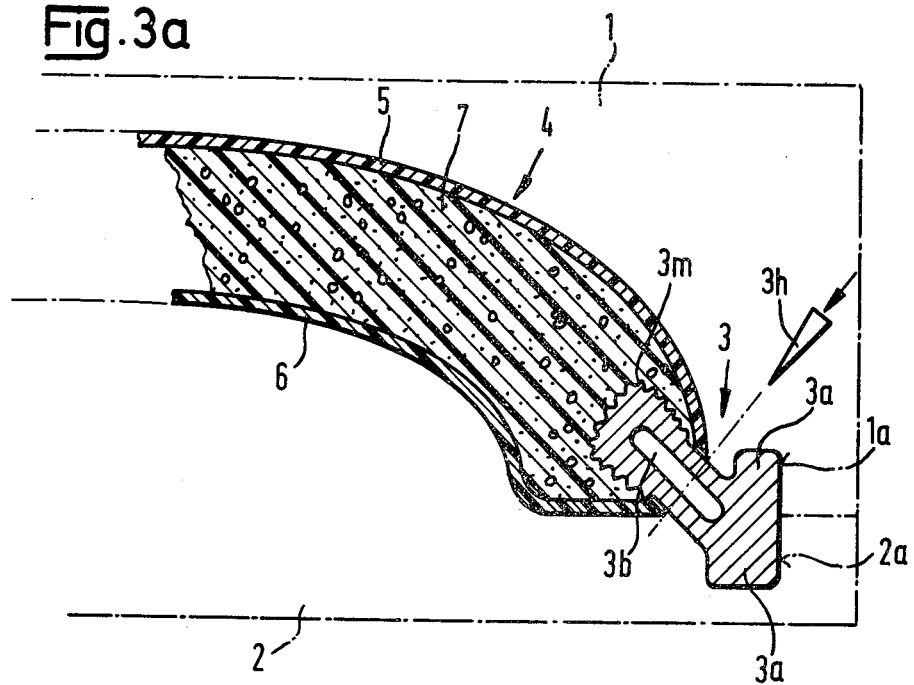
FIGS. 3a and 3b are a diagrammatic section through another embodiment of the shell connector in the foamed condition, also showing a sectional detail through the finished shell member edge.

FIG. 3a shows a further embodiment of a shell member and shell connector; it is assumed that the shell member is to be constructed as a boat deck, engine or boot cover, roof profile of a vehicle, or the like. In the case also the top shell 5 and the bottom shell 6 are introduced in the manner stated into a top mould half 1 and a bottom mould half 2, whereafter the shell connector 3 according to the invention is inserted in the receiving groove 2a in the bottom mould half 2, the connector 3, as can be seen in FIG. 3a, being disposed at an inclination to subsequent outer edge of the shell member to be produced. In this embodiment the shell connector 3 has two centring profilings 3a, one of which corresponds to a bottom receiving groove 2a in the bottom mould half 2, the other (top) centring profiling 3a corresponding to a receiving groove 1a in the top mould half 1. In this case the arrangement of the receiving grooves 1a, 2a is such that the partial joint between the top mould half 1 and the bottom mould half 2 extends in the zone between the two centring profilings 3a of the shell connector 3, so that as a result of this step the two mould halves, namely the top mould half 1 and the bottom mould half 2, are simultaneously adjusted and centred in relation to one another, since when the shell connector 3 is inserted, for instance, into the bottom mould half 2, when the top mould half 1 is placed on, its receiving groove 1a is centred on the top centring profiling 3a of the shell connector 3, so that the use of the shell connector 3 according to the invention at the same time forms a satisfactory centring and adjustment of the two mould halves during the process of production of the shell member, without the need for any special guide pins or other guide means between the mould halves.

Referring to FIG. 3a, the shell connector 3 according to the invention has on its inner surface a corrugation 3m which is used to improve the adhesion of the foamed-in foam material core 7. In this case also the outer edges of the top and bottom shells 5, 6 immediately adjoin the recess which is used for receiving the shell connector 3 in the particular mould parts 1, 2. Also as shown in FIG. 3a, the shell connector 3 has a snap-in recess 3b which extends on both sides of the zone of a subsequent parting cut 3h and of the subsequent transition edge between the top shell 5 and the bottom shell 6, so that when the foamed material core 7 has been pressed in and has cured, and the mould halves 1, 2 have been opened, the shell member 4 is removed, whereafter the parting cut 3h can be performed.

Figure 3B:
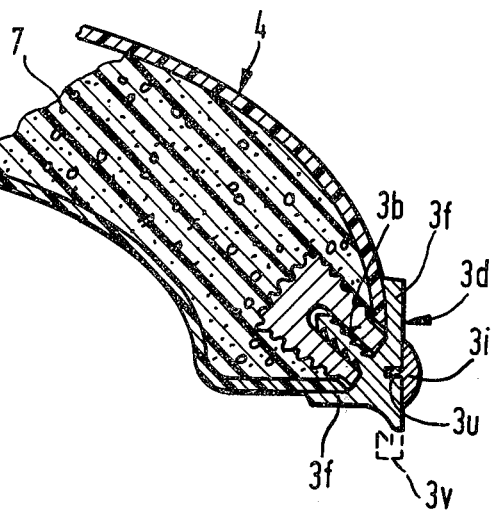

As can be seen from FIG. 3b, after the removal of the parted portion 3g, a snap-in profile 3d is pressed into the snap-in recess 3b now exposed, if necessary with the inclusion of an application of plastics, adhesive or the like, so that accordingly both the snap-in recess 3b and also the end edges of the top and bottom shells 5, 6 which immediately abut the shell connector 3, are covered; again, as already described, the cover flaps 3f of the snap-in profile 3b bear with prestressing against the corresponding surfaces of the top and bottom shells 5, 6 thereby producing a sealing tight closure. In this case also the shell connector 3 can be made of plastics, or some suitable metal which is correspondingly surface activated or given an application of plastics or a vulcanisation; it is also possible to cover the shell connector by melting on a plastics layer or to produce a hermetic seal by subsequently vulcanising or melting on the snap-in profile 3d.

Referring to FIG. 3b, in this case also the snap-in profile 3d can have a further snap-in recess 3u, into which a decorative, covering, impact-protecting, sealing profile 3i or the like can be inserted. The bottom outer edge of the snap-in profile 3d can also have a dripping lug 3v, an anchoring lug or the like; if a hooking profiling is used for the lug 3v (shown in chain lines in FIG. 3b), an extra connection to another member can be created. With this construction, for instance, the covering of a motor vehicle or the like can be very simply attached to the supporting walls simply by pressing it on. In this case also extra securing profiles can be formed on the covering flaps 3f, so that snapping-in can be performed, but not lifting out again.

As shown in FIG. 3a, in this case also the shell connector 3 according to the invention can be disposed on the outer corner or some other corner of a member, if necessary also at any other place to reach the particular requirements of the mould halves 1, 2.

FIG. 4a shows a further embodiment; it is assumed that the shell member is relatively thin and constructed substantially with a narrow edge or with sharp convergence. In this case also a top and bottom shell 5, 6 are introduced in the mould halves 1, 2 whereafter the shell connector 3 according to the invention is inserted by centering profiling 3a in one of the shell halves into the corresponding receiving groove 1a, 2a of the top and bottom mould halves 1, 2.

FIG. 4a shows how the centering profiling 3a can be formed as a simple round profile, so that in this case also the shell connector 3 is reliably retained in one of the mould halves, during the insertion operation; after the assembly of the two mould halves 1, 2 by the shell connector 3 they are secured in position satisfactorily in relation to one another, so that there is no need for further centring recesses, centering pins or similar guide profiles. This is more particularly important with members of large area, due to the elimination of the guide means which impede introduction into the mould. After the shell connector 3 has been inserted in one mould half, as already stated, the mould can be closed, whereafter the foam material core 7 is pressed in. After the subsequent curing of the foamed material core 7 the finished shell member can be removed from the opened mould halves, and then the parting cut 3h is made in the bottom shell 6 in the zone of transition from the top shell 5, so that the aforedescribed snap-in recess 3b is exposed. The shell connector 3 according to the invention has two or more anchoring lugs 3c in the form of a dovetail or multi-jag arrangement; in addition to the aforementioned longitudinal profiling a further fine profiling can be provided in the form of a corrugation or the like 3m. Other surface-increasing steps can also be used, such as surface activation, surface appliations, rubberisation, application of plastics or the like.

As shown in FIG. 4b, after the parted portion 3b has been removed, a snap-in profile 3d is pressed, driven, vulcanised or melted into the exposed snap-in recess 3b. The snap-in profile 3b is, for instance, substantially semi-circular. The outer covering flaps 3f again bear with prestressing against the outer surface of the top and bottom shells 5, 6. More particularly in the zone of the covering flaps 3f an extra seal can be provided in the form of an application of adhesive, plastics or vulcanisation, melted-on plastics or the like, so that by this method relatively narrow-edged members can be produced such as can be used for doors, windows, boats decks, radiators, cover flaps and other components.

FIG. 4c shows a variant embodiment of the snap-in profile 3d which has a bottom covering flap 3f bearing in the aforementioned manner under prestressing and with the addition of connecting means against the outer skin of the bottom shell 6, while the top part of the snap-in profile bears, also with the formation of a covering flap 3f, a corrugated strip 31 receiving both an edge protection, and also a retaining means for further components, if necessary with the production of a corresponding profiling. In the manner already described a further snap-in recess 3u can also be provided at a suitable place, into which a decorative, sealing, impact-protecting or wear or cushioning profile or the like 3i can be snapped. Furthermore, a sealing lip 3k can be formed on one of the free edges or at a suitable place on the snap-in profile 3d; this is more particularly advantageous if the snap-in profile is made of, for instance, PVC or a suitable resilient plastics, rubber or the like, this resulting in both a covering of the shell parts at their abutting edge and also a protection of the edge of the shell member. At the same time a seal is created and conventional extrusion moulding profiles can be used, so that any required sealing, covering, protective, abrasive, cushioning, optical, decorative effect or the like can be obtained in a very simple manner and the shell connector according to the invention can be used for all purposes.

Figure 5A:
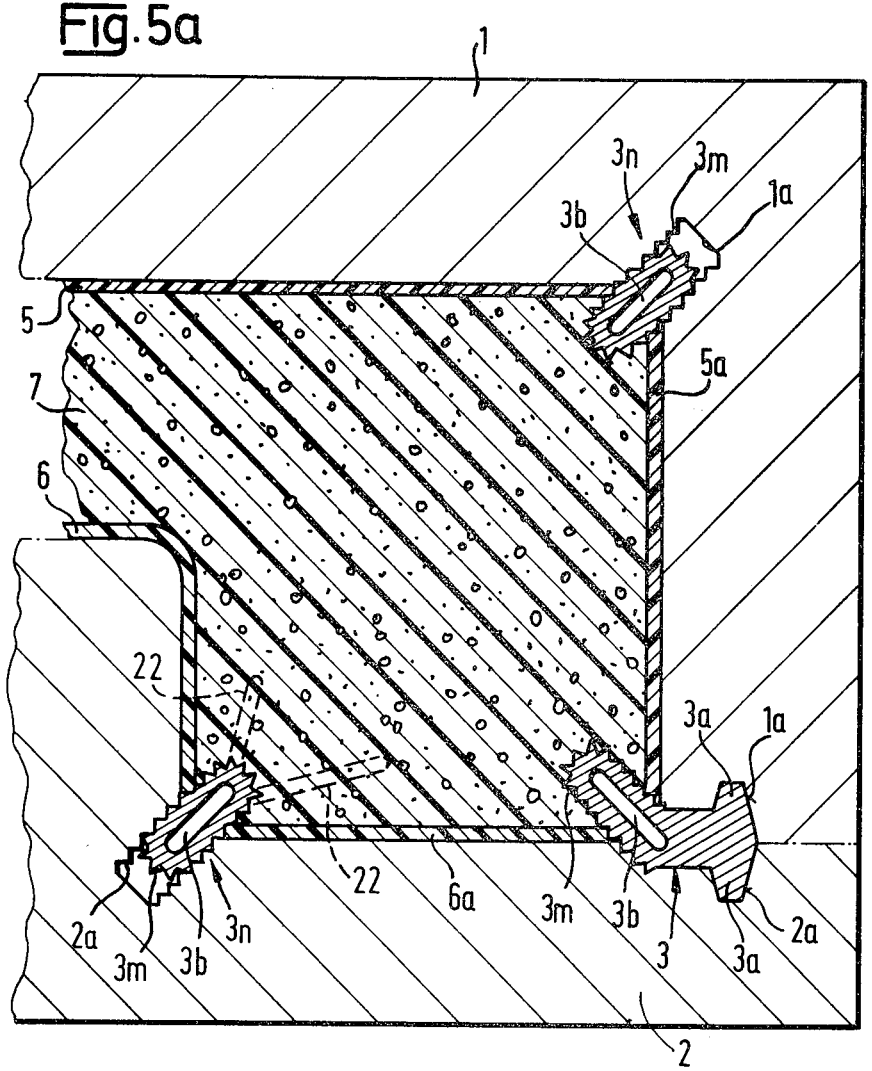
FIGS. 5a and 5b show diagrammatically another embodiment of a shell member with inserted corner profiles after the foaming and finishing of the edges.
Figure 5B:
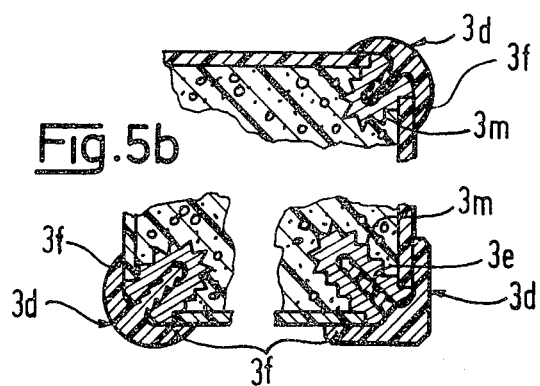

FIGS. 5a and 5b show a further embodiment of the shell connector 3 according to the invention used, for instance, for a vehicle door or a fairly large covering, structural, walls, container, roof member or the like. In this case also top and bottom shells 5, 6 having shell parts 5a, 6a are introduced into top and bottom mould halves 1, 2; when the mould parts have been closed a foamed plastic core 7 is injected into the resulting cavity. To produce specially protected, decorated, cushioned or gripping or fitted-in edges, there are provided at one or more corners or other suitable zones extra corner profiles 3n inserted in corresponding receiving grooves 1a, 2a in the mould parts, as will be described hereinafter in connection with FIGS. 6d and 6e.

In this embodiment, with the mould halves opened, corner profiles 3n are first inserted in receiving grooves 1a, 2a, the corner profiles 3n having a surface corrugation 3m enabling the corner profiles 3n to be introduced into the correspondingly smooth or corrugated profiled recesses 1a, 2a in the top and bottom mould halves so as to enable the corner profiles 3n to be adjusted to different depths of insertion in relation to the shell member to be produced. Similarly, the shell connector 3 is inserted in corresponding recesses 1a, 2a in the top and bottom mould halves 1, 2; the shell connector 3 has, for instance a top and bottom centring profiling 3a whose cross section is, for instance trapezoidal, so that the shell connector according to the invention can also be used as a precise manner of ensuring the position of the two mould halves 1, 2 placed one on the other. In this example the mould separating plane extends in the zone of abutment of the two trapezoidal profiles, as shown in chain-dotted lines in FIG. 5a. Just like the shell connector 3, the corner profiles 3n can have reinforcing ribs 22 (as shown on the left at the bottom of FIG. 5a), so that the corner profile 3n also provide a further reinforcement of a shell member.

In this embodiment the shell connector 3 again has a snap-in recess 3b in the zone of transition from the top shell 5 to the bottom shell 6, one or more corresponding snap-in recesses 3b being provided also in the corner profiles 3n, so that when the shell member has been removed from the mould, the aforementioned parting cut free edge can be performed. The parting cut is so performed as to complete the outer profiling of the shell member to be produced, which is then interrupted merely by the snap-in recess 3b. In this case also a shell connector 3 has a corrugation 3m to improve adhesion, and extra anchoring flaps or the like (not shown) can also be provided. After the finished shell member has been removed from the mould, something which can be performed by resiliently pressing the corner profiles 3n out of their receiving grooves 1a, 2a, when the parting cuts have been made a snap-in profile 3d can be snapped in to each exposed snap-in recess 3b, as shown in FIG. 5b. The top corner, for instance, can have a hook-shaped snap-in profile having covering flaps 3f which can be connected by an extra application of adhesive, plastics, vulcanisation or the like to the surface of the adjoining top and bottom shell parts. Similarly, at the bottom corner a snap-in profile 3d with covering flaps 3f can be disposed as described hereinbefore, and the parting cut can be performed at an inclination, so as to obtain a completely neat closure and transition of the individual surfaces. However, a connecting profile 8 can also be snapped into the exposed snap-in recesses 3b of the corner profiles 3n or the shell connector 3, as will be described hereinafter in connection with FIG. 6c. In this way a connection to other members can be made in a very simple manner.

FIGS. 6a – 6g illustrate further embodiments of the shell connector and its application.

Referring to FIG. 6a, for instance, with a parallel construction at the top and bottom shells 5, 6, the shell connector is given covering flaps 3f which are bent and parallel with the top and bottom shells 5, 6 so that with the two shells 5, 6 substantially parallel, a substantially rectangular, sealed edge is produced running all around. In this case also there can be provided on the inner side — i.e., on the side of the shell connector 3 pointing towards the foamed material core 7 — one or more anchoring lugs 3c which can have an extra corrugation 3m to improve adhesion to the forward material core 7. The inside of the shell connector 3 can have an activation surface, rubberisation, an application of plastics or the like, which is connected to the adjoining shell parts 5, 6. Again, a, for instance, trapezoidal centring profiling 3a can be provided to project to the outside on one or both sides, a profiling 3a serving to retain the shell connector 3 in one or other mould halves 1, 2, or both. If there is no need for a special construction of an extra snap-in profile, at the place of the subsequent parting cut 3h the shell connector 3 can have a drawn-in portion 3w on one or both sides which marks the subsequent cutting edge, so that after the shell connector has been removed from the mould and the parted portion 3g has been separated and removed, a clean surface can be obtained. The shell connector 3 illustrated in FIG. 6a can be divided in the zone of the mould separating plane to facilitate insertion in the mould.

Referring to FIG. 6b, to produce a flat end closure of the shell member edges, the shell connector 3 can have in the zone of the subsequent outer surface, outer edges 30 which can be either straight or profile, arched or the like, to correspond to the subsequent surface, and which are subsequently adjoined by the outer surfaces of the top and bottom shells 5, 6. Again anchoring lugs 3c and/or a corrugation 3m can be provided to improve adhesion. In this case also the snap-in recess 3b extends into the zone of the subsequent parting cut and is covered on the outside (FIG. 6b) by a centring profiling taking the form, for instance, of a simple semi-spherical part; this is particularly advantageous if the direction of movement from the mould extends at an inclination from one mould half or the other towards the centring recess, since due to its snap-in recess 3b the centring profile 3a can readily be removed from the mould with resilient compression. After the removal of the parted portion 3g by making the parting cut 3h in this case also the snap-in recess 3b is exposed, if any such recess is provided and unless, for instance simply by removing the parted portion 3g — i.e., cutting away the centring profiling 3a — a flat closure is obtained, as already described in connection with FIG. 6a.

Into this exposed snap-in recess 3b a connector 8 (FIG. 6c) can be snapped which has, adjoining a central member 3t, a rearwardly directed hooked toothing on both sides with anchoring lugs 3c and which can then be driven into the exposed snap-in recess 3b, whereafter the adjoining member is pressed by its exposed snap-in recess 3b on to the other free side of the connector 8. As already mentioned, an addition of adhesive, age-hardening plastics, sealant or the like can be made, so that a sealing tight foam connection can be produced by the outer edges 30 of the shell connectors 3 and the shell members abutting on one another.

FIG. 6d shows another embodiment of a shell connector, as has already been discussed in connection with FIGS. 5a and 5b as a corner profile 3n, the shell connector 3 shown in FIG. 6d has a substantially flat shape and has in its inside a snap-in recess 3b which can also have an internal corrugation or the like 3m, although the snap-in recess 3b can also have smooth inner walls.

The inner corrugation described and illustrated with reference to FIG. 6d of the snap-in recess 3b can also be used with the shell connector described hereinbefore and hereinafter; in that case the snap-in profiles have a simple profiling or can even be flat, since the corrugation 3m of the snap-in recess 3b ensures that the parts are held together.

As shown in FIG. 6e, the shell connector 3 described in connection with FIG. 6d can be used by a toothing 3p being disposed in the mould halves 1, 2 in the zone of the receiving grooves 1a, 2a. In the production of the shell member the top and bottom shells 5, 6 are introduced into the two mould halves 1, 2 and the shell connector 3 is then introduced into a selected position in the toothing 3p; in accordance with the selected pitch of the teeth, the relative position of the shell connector 3 in relation to the outer edge of the shell members can be of different depth, in dependence on the toothing position into which the shell connector is inserted. To secure the position during introduction of the mould, the shell connector can be introduced into the bottom mould half 2 and secured in its starting position, for instance, by adhesive. After the top mould half 1 has been laid on, the two mould halves are centered in relation to one another by means of the common toothings of the shell connector and mould halves, the result being a satisfactory adjustment of the relative positions of the mould halves 1, 2 and the shells 5, 6.

After the foamed material core 7 has been foamed in, the finished shell member is removed from the mould halves and the parting cut is carried out in the way already mentioned, so that the snap-in recess 3b can be exposed and then again, for instance, the connection profile (FIG. 6c), or a covering snap-in profile (e.g. FIG. 2, or FIG. 5b, or FIG. 3b) or connecting profiles (FIGS. 8b, 8d, 8f, 8h or the like) can be snapped in to the snap-in recess 3b.

In this embodiment, therefore, the position of the snap-in depth and penetration depth of the shell connector profile can be selected, and during introduction into the mould the outer edges of the top and bottom shells 5, 6 can be brought right up to the shell connector 3, so that only very narrow covering flaps 3f of a snap-in covering profile strip 3d to be inserted subsequently are necessary.

In this case, unlike what is shown in FIG. 6e, the top and bottom shells 5, 6 can be brought substantially tangentially to the transitional edge to the shell connector 3.

FIG. 6f shows a further embodiment of the shell connector; again it has a toothing 3p co-operating with a corresponding toothing in the top and bottom mould halves 1, 2, so that in this case also the depth adjustment can be selected, for instance, in dependence on the thickness of the shells to be produced.

Again, the clip connector 3 has anchoring lugs 3c and can have a corrugation 3m on its outside. To obtain a better connection to the adjoining shell outer skin, the shell connector can also have attaching flaps 3q which can be connected, with the addition or introduction of an application of adhesive plastics 3r, to the adjoining inner surfaces of the top and bottom shells 5, 6. In this case also a snap-in recess 3b is provided which (FIG. 6f) has an inner widened portion into which a correspondingly fixed snap-in profile 3d, having a corresponding circular edge, can be pressed or glued, after the snap-in recess 3b has been exposed by removing the lost part 3g after making the parting out 3h.

FIG. 6g shows, for the simplification of the introduction of the shell parts into the mould, a separate shell connector — i.e., a two-part shell connector — in which undercut centring profilings 3a are provided which co-operate with correspondingly undercut recesses or receiving grooves 1a, 2a, in the mould top and bottom halves 1, 2, so that the shell connector halves can be retained securely in their positions relative to one another by being resiliently pressed into the slightly undercut profilings. The outside of the shell connector again has a corrugation 3m which, in contrast with the aforedescribed kinds of introduction into the mould, corresponds to similarly shaped and turned-over ends of the top and bottom shells 5, 6 when an application of plastics or adhesive 3r has been applied at that place. After the assembly of the two mould halves the foamed material core 7 is injected in the usual manner; before assembly a plastics application 3r is made also in the zone of the inner separating plane of the shell connector parts and, after the resilient expansion of the centring profiling 3a on the opening of the mould halves, the snap-in recess 3b is exposed after the separation of the outer parts. In this case also the individual parts are securely sealed and connected by the plastics application 3r.

FIG. 7a and 7b show a further embodiment of the shell connector according to the invention. This embodiment is more particularly used when the shell members have a fairly large thickness and the shell connector must adhere particularly strongly to the shell parts 5, 6.

FIG. 7 shows the starting profile of a shell connector; a separate shell connector component profile is used for each mould half. As already mentioned, the shell connector component profile has a centering attachment 3a which corresponds to a similar centering recess 1a, 2a in one of the mould halves 1, 2 and is used to align the shell connector component profile accurately in relation to each mould half 1, 2. Adjoining the centering attachment 3a, in the zone of the subsequent parting place, there are disposed two grooves which form drawn-in portions 3w and characterise the subsequent parting place and facilitate the parting of the centering member. In this case also a snap-in recess 3b is disposed in the inner zone of the shell connector profile, the recess 3b extending as far as the inner zone of the shell connector component profile. The latter is continued in one or more anchoring lugs 3c for improving attachment; the or each surface of the anchoring lugs 3c has more particularly an activation, with a surface corrugation, transverse grooving, longitudinal grooving, roughening or the like and is substantially pyramidal or sharply converging, to improve introduction into the mould in the form subsequently injected. In the zone adjoining the subsequent outer shell 5, 6 there is provided more particularly a fixing attachment 3q which is used to improve adhesion, is also sharply convergent and has in the zone of transition between the shell member outer skin and the shell connector an inclined edge adjoined by the subsequent outer edge on the shell member outer skin. In this case also grooving, roughening, activation or the like can be provided to improve the connection.

To make a shell member, using the shell connector according to the invention, after the introduction of the separating means, a top gel coat layer is introduced into one mould half, and after its curing one or more further synthetic resin layers can be applied; one or more inserts, reinforcing mats, laminates or the like can be introduced into the mould. A further layer of plastics, adhesive or the like can be applied to the last layer, more particularly in the zone of the reinforcing or connecting flap 3q or the zone of connection of the shell member outer skin to the shell connector outer edge 30. The shell connector is then laid into its mould half with its centring attachment 3a, the zone of the shell connector adjoining the shell outer skin is laid on the layer of plastics or adhesives supplied at that place and enters into an intimate connection therewith, unless it is enough for the setting of the shell connector to take place subsequently by the pressed-in foamed material.

The same procedure is followed for the second mould half; before the assembly of the two mould halves adhesive, synthetic resin or the like can also be applied to the subsequent connection place between the two shell connector component profiles, if such place is disposed inside the subsequent edge zone of the shell member to be produced. The mould is then closed so that the two shell connector component profiles are rigidly connected to one another at their contact place. After the foamed material has then been injected through a suitable aperture and has cured (FIG. 7c), the shell member can be removed from the mould and then the parting cut is performed in the zone of the end edge to be produced, thus exposing the two or more snap-in recesses 3b.

As a result of the previously introduced plastics layers and the injected foamed material all the contact surfaces between the shell connector component profiles are rigidly interconnected and tightly sealed against the surroundings, so that the result is a sealed end profile as shown in FIG. 7d.

As already mentioned, instead of one snap-in recess 3b with adjacent fixing attachment 3q, a number of snap-in recesses 3b with corresponding attachments can be provided; this is more particularly favourable if the shell member to be produced is fairly thick.

FIGS. 7e and 7f show embodiments of the shell connector according to the invention which are used if a shell connector part is inserted in each of the mould halves. As in the previous embodiments, the shell connector has one or more snap-in recesses 3b and one or more corresponding anchoring lugs 3c are provided. Also, there are provided in the zone of connection to the particular shell parts, attaching flaps 3q which are used for application to the adjacent shell member inner walls, with the introduction of plastics, adhesives or the like. The attaching flaps 3q are adjoined by outer edges 30 which extend outwards at an inclination and merge rearwardly into a flat surface which can produce the subsequent parting plane 3h. In each of the outer zones (to be subsequently parted) there are provided centering profiles 3a which merge inwardly into recesses or drawn-in portions 3w which mark the parting cut.

To enable the top and bottom mould halves 1, 2 and more particularly the two shell connector component profiles 3, which are each introduced into their mould half separately, to be satisfactorily centred in relation to one another, each shell connector component profile has an intermediate profiling 3x, such profilings corresponding to one another, so that when the two mould halves are laid on one another the intermediate profiling 3x also produces an accurate adjustment of both the individual shell connector component profiles and also of the two mould halves 1, 2, so that the subsequent outer edges of the shell member are accurately aligned. FIG. 7f shows also that the shell connector component profiles can have in the zone of their subsequent contact surface a centring toothing 3y. Use can therefore be made of two identical shell connector component profiles which can have the aforementioned anchoring lugs 3c, snap-in recesses 3b and corrugations 3m and attaching flaps 3q, and there can also be provided the drawn-in portions 3w on the outer sides which mark the subsequent parting surface and merge into a flat outer surface adjoined by the outer edges 30.

By this step the two shell connector component profiles can be accurately adjusted and centred in relation to one another, and so also can the mould halves 1, 2 and the shell members and top and bottom shells 5, 6; a sealing tight closure and rigid connection can be obtained by introducing adhesives, plastics or the like into the zone on the contact surfaces between the two shell connector component profiles — i.e., in the zone of the centring toothing 3y.

Figure 8G:
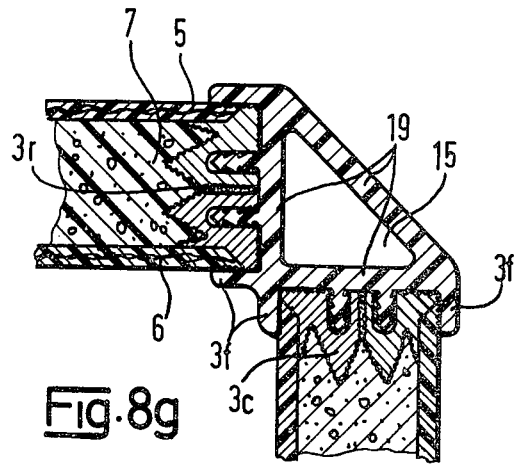

FIGS. 8a – 8g show a sample of application of the aforedescribed shell connector embodiments; an edge profile, for instance, for making a door rebate is snapped in to the snap-in recesses 3b exposed by the parting cut. The door rebate has two outer covering flaps 3f which engage over the outer edges of the two shell outer skins 5, 6. The edge profile has snap-in hooking profiles 3d which correspond to the snap-in recesses 3b so that, more particularly after the previous application of plastics or a synthetic resin layer, the door rebate profile can be slipped, pressed, or driven on to the edge of the shell member, the snap-in profiles 3d snapping into the snap-in recesses 3b and the covering flaps 3f engaging over, so that a firm sealing tight connection is produced by the previously applied layer of adhesive or plastics. If the edge profile takes the form of a door rebate it has a covering zone taking the form of a prolongation, a covering strip 11; a door rebate profile produced, for instance, by extrusion is formed with a plastics sealing lip 17 which can be inserted in a matching recess 18, as can be seen in FIG. 8b.

The aforedescribed shell connector can also be used for making a smooth abutment. The profile shown in FIG. 8d is used; it has a central web 19 on whose outer ends covering flaps 3f are disposed on both sides. Corresponding snap-in profiles 3b are formed in the zone of the snap-in recesses. The whole inner zone of the snap-in and connecting profile can have a corrugation, roughening, activation or the like; the connection of two shell members has a straightforward plate abutment can be formed, after the previous application of plastics, adhesives or the like, simply by mechanical snapping-in, in conjunction with predetermined resilient prestressing. Like the connecting profiles disclosed hereinbefore and hereinafter, the connecting profiles can be made of rubber, plastics, hard plastics, soft plastics, of different degrees of hardness, light metal or other suitable materials.

FIGS. 8e and 8f show a further embodiment in the form of a sheet T-joint, and a sheet cross-joint. In this case also, starting from a central rim 19 lateral continuation ribs 19 are provided each of which is formed with anchoring profilings 3d corresponding to the number of snap-in recesses. In this case also a corrugation, surface activation, a grooving or the like can be provided in the zones adjoining the shell member outsides subsequently pressed in. If in the case of the profile shown in FIG. 8f for a cross joint only a T-joint is to be made, one or other snap-in profiling 3d can be removed in a very simple manner. In this case also assembly can be performed with resilient prestressing simply by pressing in, more particularly, however, adding plastics, adhesive or the like, so that the result is a simple sealing tight sheet joint.

Figure 8H:
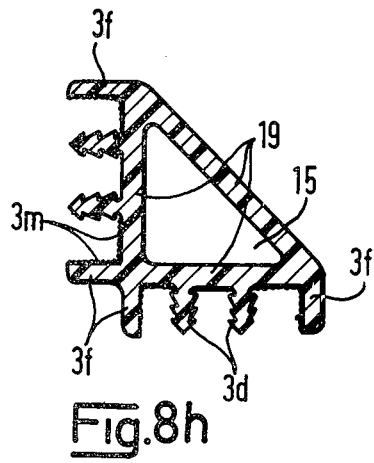

FIGS. 8g and 8h show an angle plate joint. Use is made of substantially triangular profile which has covering flaps 3f to match the subsequent shell member outer surfaces and can have in its inside, for instance, a cavity. In this case also hooking profiles constructed in the form of longitudinal profilings 3d are provided to correspond to the number of the snap-in recesses. The hooking profiles can have corresponding corrugations, profilings, roughenings, surface activations or the like, so that in this case also a secure sealing tight angle joint can be obtained by resiliently snapping the hooking profilings 3d into the snap-in recesses 3b, more particularly adding glue, plastics or the like (FIG. 8g).

Figure 9A:
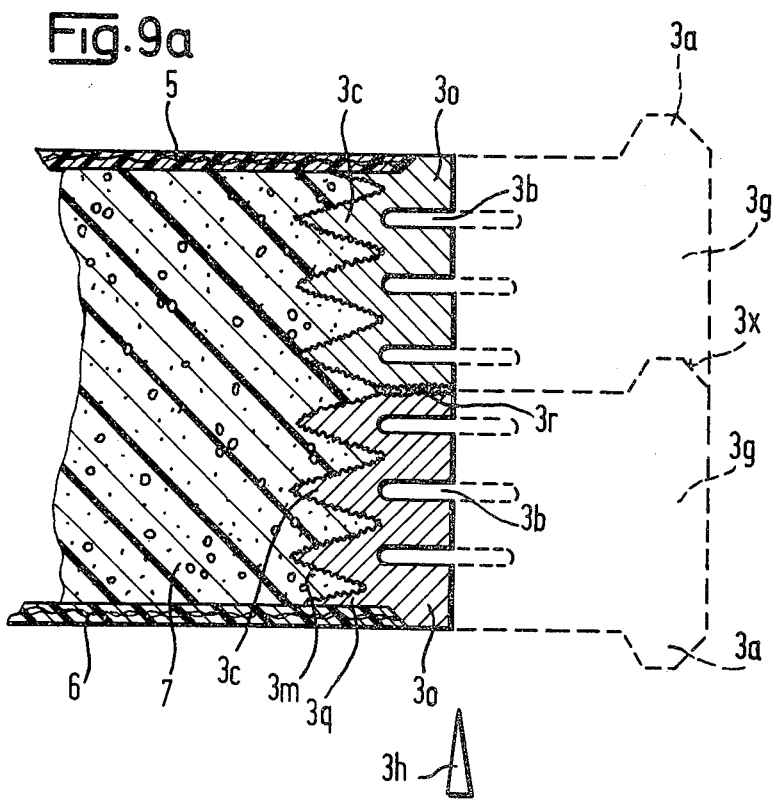

FIG. 9a illustrates an embodiment of a shell member and a shell connector used when the shell member to be made is relatively thick. Two shell connector component profiles are provided each of which is used in conjunction with one or the other mould half, 1, 2; the shell connector component profiles have the aforementioned snap-in recesses 3b, for instance, three, four or even more, corresponding to the thickness of the shell member to be produced. These are enclosed by corresponding anchoring prolongations 3c which have the already mentioned profilings 3m, surface activations or the like for improving adhesion.

In that zone of the shell connector which is to be inserted in the receiving grooves 1a, 2a in the mould halves 1, 2, there is disposed a corresponding centering profiling 3a, while in the zone of the subsequent parting place a transitional profiling 3x can be formed which can also have the aforementioned attaching flaps 3q. As a result the shell connector can be smoothly introduced into the mould, as shown in FIG. 9a, and also the shell connector edge zone can be rigidly and tightly connected to the shell member outer skin via the aforementioned connecting flaps 3q, with the previous application of plastics, adhesive or the like. After the separate introduction of the two shell connector component profiles into the two mould halves 1, 2 and the application of adhesive, plastics or the like to the subsequent contact surfaces of the two shell connector component profiles, the mould can be closed. Then foamed material is forced into the cavity at suitable places and encloses the two shell outer skins and also the two shell connector parts on all sides on their free surfaces. After the opening of the mould halves 1, 2 the parting cut can be performed, so that all the snap-in recesses 3b are exposed.

FIG. 9b shows an embodiment which can be used as a door for a motor car, boot cover, room door, cupboard door or the like, and in which an edge profile is used which engages over the outer shell skins and comprises the aforementioned hooking profilings 3d corresponding to the snap-in recesses 3b. It also has covering strips 3f which can, for instance, have a sealing profile 10; moreover, by suitable profiling, hinges can be produced to result in a single or double sealing wall profile. In this way a sealing closure is permanently obtained during the rolling movement, to the pivoting of a door or window panel, on two corresponding circular edges 11 of the corresponding edge profiles; when the end position is reached a further sealing profile 10 bears against a corresponding extension strip 12. In this case also the edge profiles can be snapped into the shell connector profiles merely by resilient prestressing; however, it is more particularly recommended to produce a completely sealing tight, gapless and firm closure by using adhesive, plastics, sealing agents or the like.

FIG. 9c shows a further embodiment which can be used, for instance, on a vehicle door. In this case also the edge profiles have the aforementioned snap-in profilings 3d. The aforementioned covering flaps 3f, engaging over the edges of the shell member outer skins, are also provided, and so are curved covering flaps 13, 14 and correspondingly disposed sealing profiles 10 for making a door connection and producing a sealing effect. The sealing profiles 10 can either be single or double; merely one sealing profile 10 can be provided which comes into operation only when the end position is reached. This embodiment seems particularly advantageous for gas tight doors, for instance, for sealed rooms in workshops which must be kept free from dust; vehicle and aircraft doors and the like can also be made with the profile constructions according to the invention.

FIGS. 10, 10a – 10c illustrate embodiments of the use of a shell connector such as has already been described in connection with FIG. 6b and 6c. To make, for instance, a boat's deck, in accordance with 10b, after the top shell 5 has been inserted into the top mould half 1 and the bottom shell 6 into the bottom mould half 10, the shell connector 3 is inserted by its centring profiling 3a in a corresponding receiving groove 10a in the bottom mould half 2; then the top mould half 1 is laid on the bottom mould half and the foamed material core 7 is injected through a suitable aperture and encloses the two shells 5, 6 and the shell connector 3. The use of anchoring lugs 3c with corrugations 3m produces a firm connection and the formation of the outer edges 30 on the shell connector 3 produces a smooth outer closure. After the mould halves 1, 2 have been opened, the shell member can be removed, whereafter the snap-in recess 3b is exposed by making the aforementioned parting cut.

In a similar manner (FIG. 10b) the bottom part, for instance, the boat hull can be made. In this case, the use of two shell connector profiles is illustrated which are inserted in corresponding parallel receiving grooves 1a in the bottom mould half 1 (shown at the top in FIG. 10c). In this case also the shell connector component profiles have outer edges 30 and anchoring lugs 3c extending into the inner space and also a corrugation 3m. After the top and bottom shells 5, 6 have been inserted into the mould halves 1, 2, the shell connector profile parts, which can also have outer edges 30 abutting the outer shells 5, 6, are inserted. After the injection of the foamed material core 7 and its hardening, the mould halves 1, 2 are opened and the shell member removed. Then the parting cuts are made to expose the snap-in recesses 3b in the plane of the outer edges 30. For assembling the two parts, it is enough for a connector 8 (as described with reference to FIG. 6c) to be pressed into a snap-in recess 3b in one shell part, whereafter the other shell part is pressed by its snap-in recess 3b on to the connector parts exposed; plastics, adhesive or the like can be applied more particularly in the zone of the whole separating plane or of the connector 8.

If the aforementioned double profile is used, as shown in FIG. 10, a double connector 8 can also be provided (described in relation to FIG. 8d); this connector has outer covering flaps 3f and double anchoring lugs and hooking profiling 3d are provided on both sides which correspond to the snap-in recess 3b, giving the connection maximum strength.

In this case also, as already stated, plastics adhesive or the like can be introduced into all contact surfaces, so that a complete seal and secure transmission of the forces occurring can be achieved in the zone on the covering lugs.

FIG. 10d shows a connection of a deck to a boat hull; both parts are manufactured in the form of shell members using the shell connector according to the invention, which in this case is again in two parts. For the rest the connecting profile 8 can be substantially triangular, corresponding to the particular curvatures of the shell members, and have corresponding snap-in longitudinal profilings 3d and the aforementioned covering flaps 3f engaging over the wall parts of the shell outer skins. The whole connection is produced more particularly using resilient snapping in with the addition of adhesives, plastics, sealing agents, or the like, so that even high forces can be taken by the two parts and transmitted from one part to the other. The edge profile has a substantially triangular cavity which can be used more particularly for the application of various parts, the insertion of cables or the like, sealing tight closure being then obtained in spite of the use of hollow rivets, screws or the like.

FIG. 10e shows another embodiment of a connection between a boat's deck and hull and between two curved or inclined shell members; shell connectors cut off at an angle are provided with correspondingly shaped snap-in recesses 3b into which a connector 8 formed with corresponding hook-in profiles 3d and having the aforementioned covering flaps 3f is snapped.

The inclined construction of the abutting edges between the deck and the boat's hull between the two members produces an elongation of the contact surface; in the abutting edge zone the two shell connectors are cut off at an inclination correspondingly, and the connector shown in FIG. 8 is snapped into the snap-in recess 3b then exposed, more particularly with the previous addition of adhesive, plastics, or the like, so that an extremely firm connection is obtained. The covering flaps 3f bearing against the outsides of the shells are an important safety measure against the individual layers being torn, bent, split upwards or the like; moreover, high tensile and bending forces can be transmitted to the edge connection on account of the jags of the snap-in profiling 3d which is secured against being pulled out.

FIGS. 10g and 10h show other embodiments which are used if the shell members to be connected (in this case the outer edge of a deck and of a boat hull) are cut off at right angles. In this case again the shell connectors according to the invention are used in which, after the separation of a centring profiling 3a, one or more snap-in recesses 3b are exposed. Snapped into the snap-in recesses 3b is a connector 8 (shown in FIG. 10g); it is assumed that the deck is to engage over the abutting edge of the boat hull. The bottom layer of the deck bears over a wide surface against the edge connector; in this case also a secure and sealing tight connection is obtained by adding adhesives, plastics, or the like before the individual parts are assembled; more particularly the wide webs 19 of the edge connector offer secure protection against ramming.

FIG. 10h shows an embodiment in which it is assumed that the side wall of the boat hull engages over the deck and a correspondingly constructed edge connector 8 is introduced into the exposed snap-in recesses 3b; in this case also more particularly plastics are added to seal and reinforce the connection. In this case also, as in all the previously described embodiments two shell connector component profiles are used, each of which has, for instance, only one snap-in recess 3b. However, if the parts to be connected have thicker walls, the shell connector for each mould half can have not only one snap-in recess 3b, but two, three or more snap-in recesses 3b, so that a large number of connecting places are created. Moreover the covering flaps 3f of the edge connector parts engaging over the outer shell surfaces be constructed in various widths to engage over the joints to a varying extent. The inner surfaces bearing against the shell parts and connectors can have a corrugation, profiling, melted-on plastics, surface activation, or similar means for improving adhesion, so that the construction of the connection of individual shell members according to the invention is tight against both liquids and gases and is able to take extremely high tensile, shearing, bending and twisting forces; this is of more particularly importance when, as previously mentioned, the shell connector according to the invention is used for connecting parts of boats, more particularly sailing boats.

Figure 11:
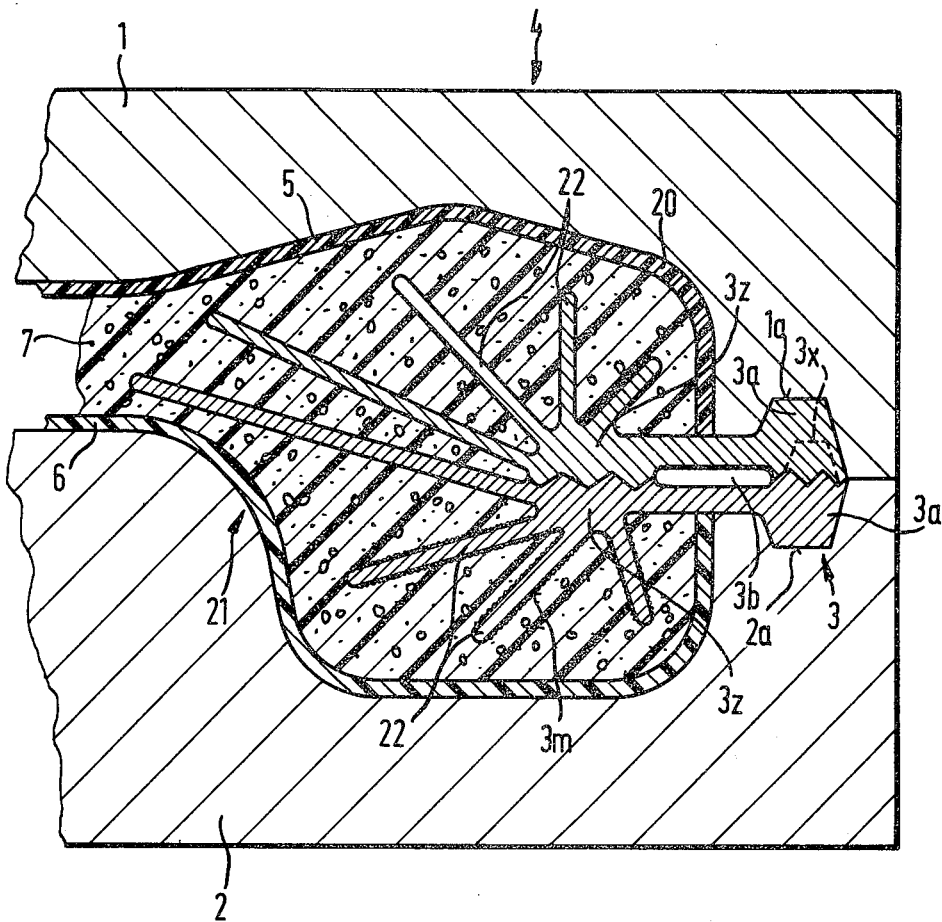
FIG. 11 shows a shell connector with a reinforcing profiling.

FIG. 11 shows an embodiment of a shell connector which is used when the connector is to perform a reinforcing and supporting function as well as forming the edge.

Referring to FIG. 11, a special reinforcement is provided in a shell member, for instance, in the zone of the opening in the deck of a boat; more particularly in a very simple manner a whole member has extremely high strength merely with simple laminate layers. The shell member 4 is so constructed that an outer shell 5 is inserted in the top mould half 1 and the bottom shell 6 in the top mould half 2, and reinforcing layer 10b added in the manner disclosed hereinbefore. Special shaping of the member can act as a reinforcement, so that a reinforced edge 21 is formed on the member, with corresponding shaping of the mould halves 1, 2, the edge 21 acting, for instance, as a setting-up surface 20. In this case also centring profiling 3a are provided in the single or two-part shell connector 3 to be introduced, the profilings 3a corresponding to receiving grooves 1a, 2a in the mould halves. With a two-part construction a further intermediate profiling 3x is provided for centring the shell connector component profiles in relation to one another. In the inner hollow space zone of the reinforced edge 21, a plurality of reinforcing ribs 21 are provided extending inwardly on the shell connector, the ribs starting from the centre recess 3b, a corresponding central zone 3z being created from which the ribs 22 start. During introduction into the mould, the reinforcing shell connector 3 or shell connector part is so inserted into the bottom mould half 2 and the ribs 22 extend into the free inner space, and a corresponding snap-in profiling of the centring profiling 3a can be provided, so as to ensure the precise position of the ribs 22 in the space inside the mould caviity. The top mould half 1 is then laid on the bottom mould half 2, the centring profiling 3a producing mutual centring of the two mould halves, so that the abutting edges of the top and bottom shells 5, 6 which abut the shell connector are disposed exactly aligned, and a shell connector component profile is also inserted in the top mould half and after the closure of the mould all the parts are retained in their required position in relation to one another by the aforementioned intermediate profiling 3x (shown in chain lines in FIG. 11).

After the introduction of the foamed material core 7 the reinforcing shell according to the invention is foamed on all sides into the cavity, thus producing maximum strength and reinforcement. After the separation of the centering profile 3a, the or each snap-in recess 3b is again exposed, which can then be covered by the aforementioned snap-in profiles, with the possible addition of an application of adhesive. Alternatively, use can be made of the aforementioned shell connector (e.g. illustrated in FIGS. 6d, 6b or 6g) in combination with the aforementioned embodiment.

As already mentioned, the shell profile according to the invention takes the form of an extruded profile and can be made, for instance, from hard rubber, one of the conventional plastics, such as PVC semihard and PVC hard, neoprene, polyurethane or the like, of different suitable degrees of hardness or of metal, and the free surfaces can each have a surface activation to improve the connection, and also a plastics or rubber layer; moreover the surfaces can be, for instance, in the case of metal roughened, profiled, corrugated, grooved, coated or given a similar treatment. The edge connector profiles can also be made of hard rubber, plastics, metal or the like, and their surfaces in contact or connected with the shell connectors and shell members can have a surface activation, roughening, profiling, corrugation, coating or the like, and also, for instance, a cold or hot vulcanisable rubber or plastics layer can be used.

The edge connectors to be used together with the shell connector can also have a decorative, protective, insulating, wear-resistant layer or a further snapped-in or similarly attached protective or edge profile, so that the shell connector together with the edge profile according to the invention can be used for all purposes.

As already mentioned, the shell connector according to the invention is used for covering the edges usually exposed in foamed shell members, and also for the centring over a large surface of the two mould halves, when the shell connector is in one piece. Use can also be made, however, of a two-part or multiple part shell connector for centring the two mould halves. In that case the shell connector as diagrammatically illustrated in FIGS. 7e and 7f and 9a has a further centring surface so co-operating with a matching profiling of the corresponding shell connector that one shell connector is inserted into one mould, the other shell connector being inserted into the other mould; the two shell connectors have interengaging profilings on their corresponding surfaces (cf. for instance, FIGS. 7e, 7f, 9a).

This connecting and centring profile, extending over a large area or the whole periphery, gives the individual members an extremely accurate shape even if they are large, so that due to resilient deformations, deviations would occur in the individual edge zones between the two mould halves. This is more particularly the case if only a few guide pins or similar guide means are used which progressively become worn and would therefore lead to some play and a certain offsetting of the two mould halves. This progressive increase in the play and therefore the offsetting is obviated by each fresh insertion of the shell connector profiles with their mutual centring profilings, and each individual shell member removed from the mould has an exact and precise precision of its free abutting edges, which is produced by the shell connector according to the invention. Moreover, however, the abutting edge can also be very simply reworked during the cutting operation, and certain irregularities can be evened out without exposing the foamed material layer. This is more particularly important when the foamed material layer must in all circumstances be protected against the penetration of moisture, gases, vapours or the like, to avoid, for instance, destruction by frost or increased weight; this is more particularly important for parts of boats, motor vehicles, building slabs or the like, parts of walls, doors or the like. Finally, the construction of the abutting edges of shell members according to the invention has for the first time enabled the foaming process to be used for making shell members of large area sealed on all sides, and more particularly secured and reinforced at their abutting edges.

I claim:

1. A structural member comprising a pair of opposed molded plastics shells defining a cavity therebetween, plastics foam filling said cavity, peripheral edges of the opposed shells spaced from one another at a peripheral gap, a connector strip between the peripheral edges of said shells having a first edge portion exterior of the shell having at least one projection adapted to be anchored in the parting line of mold halves containing said shells, a second edge portion in said cavity between the shells anchored in said plastics foam and a connecting portion between said first and second edge portions closing the gap between the shells, and flaps carried by said connecting portion overlying the peripheries of the shells in tight sealing engagement therewith.

2. The structural member of claim 1 wherein said flaps are provided by a second strip anchored to the connecting portion of the said connector.

3. The structural member of claim 1 wherein said first edge portion of the connector is severable from said connecting portion providing an anchor for and a second strip including said flaps.

4. The structural member of claim 1 wherein the connecting portion is hollow, the first edge portion is severed from the connecting portion to expose the interior of the hollow connecting portion and the flaps are provided by a second strip having a tongue anchored in the hollow interior of the connecting portion.

5. The structural member of claim 4 wherein the second strip has a tongue snap-fitted in the hollow interior of the connecting portion to secure the flaps in position.

6. The structural member of claim 1 wherein the second edge portion of the connector strip has means radiating therefrom into the plastics foam to firmly anchor the connector in the foam.

7. The structural member of claim 1 wherein a second strip is carried by the connector and has means mounting a second structural member.

8. The structural member of claim 7 wherein said means is a pivot support.

9. The method of making plastics foam-filled structural members which comprises molding plastic shells in opposed mold halves, providing a connector strip clamping the connector strip between the mold halves around an outer edge portion of the strip while projecting an inner edge portion of the strip into the cavity between the shells in the molds, filling the cavity between the shells in the molds with plastics foam and simultaneously anchoring the portion of the strip in the cavity securely in the foam, removing the foam-filled unit from the mold halves, severing the portion of the strip projecting from the shells, and sealing the peripheral edges of the shells with flaps carried by the strip.

10. The method of claim 9 including the step of applying a separate strip around the first strip after the projecting portion has been severed therefrom to provide the flaps for sealing the peripheries of the shells.

11. The method of claim 10 wherein the second strip is snap-fitted into a recess of the first strip.

12. A structural member comprising a pair of opposed molded plastic shells defining a cavity therebetween, plastics foam filling said cavity, a connector strip extending between peripheral edges of said shells, the connector strip having a first portion adapted to be anchored in parting line of mold halves containing said shells, a second edge portion opposite said first edge portion located in said cavity between the shells anchored in said plastics foam and a connecting portion between said first and second edge portions projecting between the peripheral edges of said shells and closing a gap between the said shells.

13. The member of claim 12 wherein said connecting portion includes means for facilitating severing of said first edge portion and a portion of said connecting portion from said second edge portion and a second portion of said connecting portion.

* * * * *